US011858580B2

(12) United States Patent
Aunkst et al.

(10) Patent No.: US 11,858,580 B2
(45) Date of Patent: Jan. 2, 2024

(54) DRIVE ASSEMBLY FOR AN ELECTRIC VEHICLE

(71) Applicant: LiveWire EV, LLC, Milwaukee, WI (US)

(72) Inventors: David Isaac Aunkst, St Francis, WI (US); Samuel Nicholas Reitinger, Wauwatosa, WI (US); Eric James Klumpp, Grafton, WI (US); Ronald Hurth, Beaver Dam, WI (US); Ben Matthew Lund, Delafield, WI (US)

(73) Assignee: LiveWire EV, LLC, Milwaukee, WI (US)

( * ) Notice: Subject to any disclaimer, the term of this patent is extended or adjusted under 35 U.S.C. 154(b) by 0 days.

(21) Appl. No.: 18/179,151

(22) Filed: Mar. 6, 2023

(65) Prior Publication Data

US 2023/0202605 A1    Jun. 29, 2023

Related U.S. Application Data

(62) Division of application No. 17/560,907, filed on Dec. 23, 2021, now Pat. No. 11,623,709, which is a division of application No. 16/523,153, filed on Jul. 26, 2019, now Pat. No. 11,220,307.

(60) Provisional application No. 62/711,216, filed on Jul. 27, 2018.

(51) Int. Cl.
*B62J 41/00* (2020.01)
*B62K 11/04* (2006.01)
*B62M 7/02* (2006.01)

(52) U.S. Cl.
CPC ............... *B62J 41/00* (2020.02); *B62K 11/04* (2013.01); *B62M 7/02* (2013.01)

(58) Field of Classification Search
CPC ........................................................ B62J 41/00
See application file for complete search history.

(56) References Cited

U.S. PATENT DOCUMENTS

| 5,501,292 | A  | 3/1996  | Kawashima et al. |
| 5,657,830 | A  | 8/1997  | Kawashima et al. |
| 5,678,646 | A  | 10/1997 | Fliege |
| 6,109,383 | A  | 8/2000  | Matsuto et al. |
| 6,158,543 | A  | 12/2000 | Matsuto et al. |
| 6,276,481 | B1 | 8/2001  | Matsuto et al. |
| 8,212,438 | B2 | 7/2012  | Belton |

(Continued)

FOREIGN PATENT DOCUMENTS

| CN | 112810741 B   | 6/2022 |
| DE | 102012111962 A1 | 6/2014 |

(Continued)

*Primary Examiner* — Kevin Hurley
(74) *Attorney, Agent, or Firm* — Michael Best & Friedrich LLP

(57) ABSTRACT

An electric vehicle includes a frame, a wheel coupled to the frame, and a battery assembly including a housing supported by the frame. The housing includes a top side and a bottom side opposite the top side. A drive assembly of the electric vehicle is at least partially enclosed within a drive housing unit. The drive assembly includes a motor configured to receive power from the battery assembly and a gear assembly configured to transmit torque from the motor to the wheel. The drive housing unit is positioned below the bottom side of the housing.

4 Claims, 4 Drawing Sheets

(56) References Cited

U.S. PATENT DOCUMENTS

| | | |
|---|---|---|
| 8,485,300 B2 | 7/2013 | Hasegawa et al. |
| 8,602,150 B2 | 12/2013 | Petersson |
| 8,919,481 B2 | 12/2014 | Matsuda |
| 8,973,689 B2 | 3/2015 | Plazotta et al. |
| 9,030,063 B2 | 5/2015 | Rawlinson et al. |
| 9,038,756 B2 | 5/2015 | Mazzini |
| 9,290,226 B2 | 3/2016 | Nitta |
| 9,308,957 B2 | 4/2016 | Matsuda |
| 9,308,966 B2 | 4/2016 | Kosuge et al. |
| 9,346,421 B2 | 5/2016 | Miyashiro |
| 9,669,898 B2 | 6/2017 | Miyashiro |
| 9,692,277 B2 | 6/2017 | Pearce, Jr. et al. |
| 9,821,882 B2 | 11/2017 | Matsuda |
| 9,821,883 B2 | 11/2017 | Blasco Gracia et al. |
| 9,840,306 B2 | 12/2017 | Matsuda |
| 10,611,425 B2 | 4/2020 | Miyashiro et al. |
| 11,180,019 B2 * | 11/2021 | Matsushima ........ B60K 17/043 |
| 11,220,307 B2 | 1/2022 | Aunkst et al. |
| 11,623,709 B2 | 4/2023 | Aunkst et al. |
| 2011/0175467 A1 | 7/2011 | Belton |
| 2012/0097463 A1 | 4/2012 | Iwata et al. |
| 2013/0229072 A1 | 9/2013 | Matsuda |
| 2014/0262568 A1 | 9/2014 | Matsuda et al. |
| 2016/0226344 A1 | 8/2016 | Matsuda |
| 2017/0040863 A1 | 2/2017 | Michel |
| 2017/0291482 A1 | 10/2017 | Pearce, Jr. et al. |
| 2020/0172196 A1 | 6/2020 | Futamata et al. |
| 2020/0216138 A1 | 7/2020 | Reitinger et al. |
| 2020/0398922 A1 | 12/2020 | Hirose et al. |
| 2021/0001943 A1 | 1/2021 | Ikeda et al. |
| 2021/0001953 A1 | 1/2021 | Shirasuna et al. |
| 2022/0348283 A1 | 11/2022 | Sorenson et al. |
| 2023/0226928 A1 * | 7/2023 | Barnett .................... B60K 1/04 |
| | | 180/291 |

FOREIGN PATENT DOCUMENTS

| | | | |
|---|---|---|---|
| DE | 202017003396 U1 | | 7/2017 |
| EP | 3943376 A1 | | 1/2022 |
| JP | 2004210072 A | | 7/2004 |
| JP | 2004210073 A | | 7/2004 |
| JP | 2013010178 A | * | 1/2013 |
| JP | 2017065319 A | | 4/2017 |
| JP | 2017081323 A | * | 5/2017 |
| JP | 2020050074 A | | 4/2020 |
| WO | WO-2017154236 A1 | * | 9/2017 ........... B62D 5/0406 |
| WO | 2019186749 A1 | | 10/2019 |

* cited by examiner

DRIVE ASSEMBLY FOR AN ELECTRIC VEHICLE

CROSS-REFERENCE TO RELATED APPLICATIONS

This application is a divisional of co-pending U.S. patent application Ser. No. 17/560,907, filed on Dec. 23, 2021, which claims priority to U.S. patent application Ser. No. 16/523,153, filed on Jul. 26, 2019, which claims priority to U.S. Provisional Patent Application No. 62/711,216, filed on Jul. 27, 2018, the entire contents of both of which are incorporated herein by reference.

BACKGROUND

The present disclosure relates to electric vehicles, and more specifically to drive assemblies for electric vehicles.

SUMMARY

The present disclosure provides, in one independent aspect, an electric vehicle including a frame, a wheel coupled to the frame, and a battery assembly including a housing supported by the frame. The housing includes a top side and a bottom side opposite the top side. A drive assembly of the electric vehicle is at least partially enclosed within a drive housing unit. The drive assembly includes a motor configured to receive power from the battery assembly and a gear assembly configured to transmit torque from the motor to the wheel. The drive housing unit is positioned below the bottom side of the housing.

The present disclosure provides, in another independent aspect, an electric vehicle including a frame, a wheel coupled to the frame, a battery assembly with a housing supported by the frame, and a drive assembly at least partially enclosed within a drive housing unit. The drive assembly includes an inverter configured to convert the power supplied by the battery assembly from direct current to alternating current, a motor configured to receive power from the battery assembly via the inverter, and a gear assembly configured to transmit torque from the motor to the wheel. The electric vehicle also includes a coolant pump configured to circulate coolant to cool the drive assembly. The drive housing unit includes a gear housing at least partially enclosing the gear assembly, a motor housing at least partially enclosing the motor, and an inverter housing at least partially enclosing the inverter. The coolant pump is directly coupled to the inverter housing.

The present disclosure provides, in another independent aspect, a drive assembly for an electric vehicle including a drive housing unit with a motor housing, a gear housing, and an inverter housing, a motor at least partially enclosed within the motor housing, the motor having an output shaft defining a rotational axis, a gear assembly at least partially enclosed within the gear housing, the gear assembly including a pinion coupled to the output shaft and a drive gear meshed with the pinion, and an inverter at least partially enclosed within the inverter housing and configured to supply power to the motor. The gear housing and the inverter housing are positioned on opposite sides of the motor housing.

Other features and aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

Figure 1:
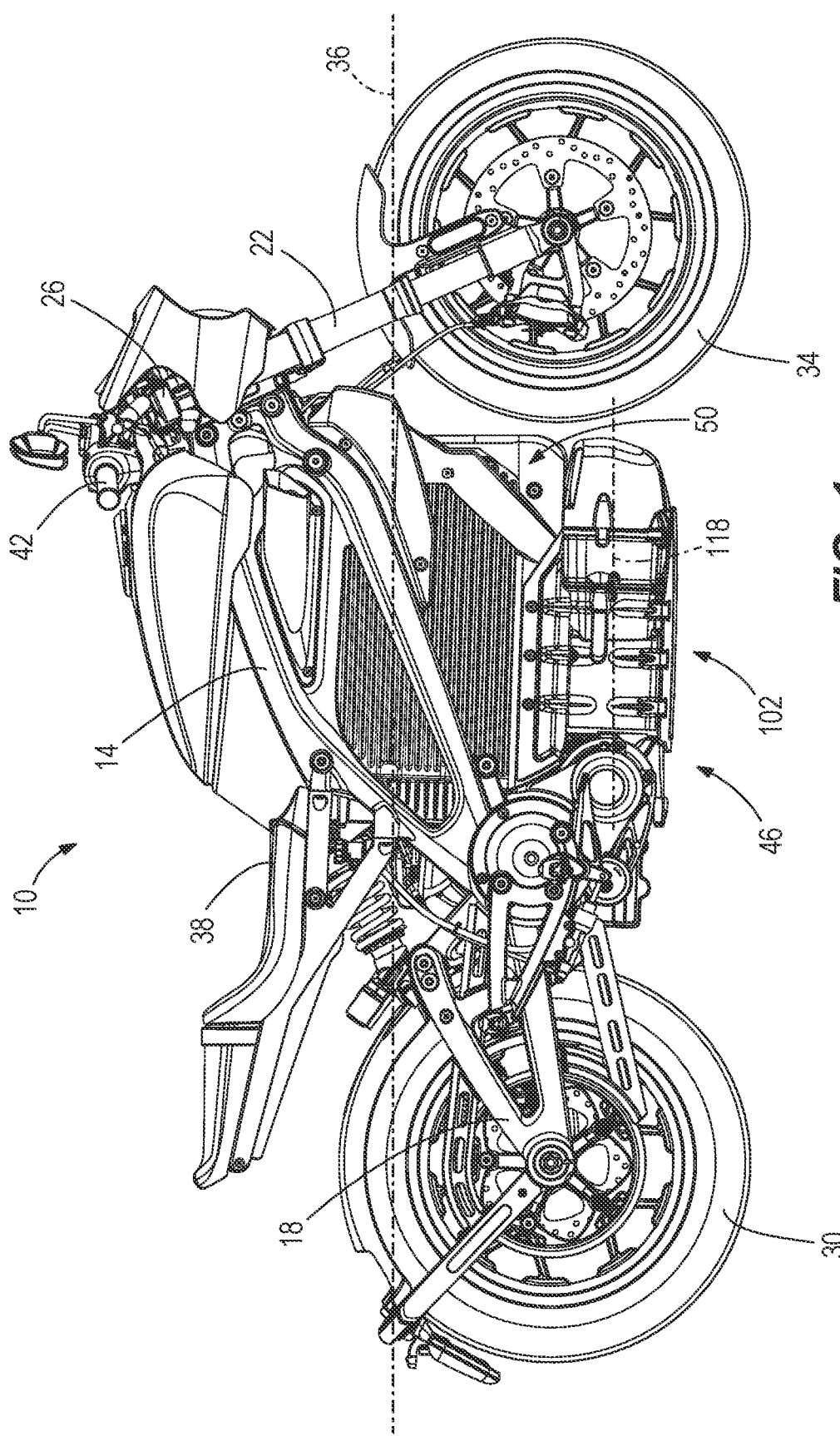
FIG. 1 is a right side view of an electric vehicle including a drive assembly according to one embodiment of the disclosure.

FIG. 1 illustrates an electric vehicle in the form of a motorcycle 10. The motorcycle 10 includes a frame 14, a swing arm 18 pivotally coupled to a rear portion of the frame 14, and a front fork 22 rotatably coupled to a front portion of the frame 14 at a steering head 26. A rear wheel 30 is coupled to the swing arm 18, and a front wheel 34 is coupled to the front fork 22. The rear wheel 30 and the front wheel 34 support the frame 14 for movement along the ground. The motorcycle 10 defines a longitudinal axis 36 that extends centrally through the motorcycle 10 along the length of the motorcycle 10. In other words, the longitudinal axis 36 extends within a longitudinal mid-plane that bisects the motorcycle 10 along its length. A straddle seat 38 overlies at least a portion of the frame 14 for supporting at least one rider, and the motorcycle includes handlebars 42 coupled to the front fork 22 via the steering head 26 for steering the front wheel 34. Various controls and indicators for operating the motorcycle 10 may be located on the handlebars 42.

The motorcycle 10 further includes a drive assembly 46 coupled to the rear wheel 30 to provide torque to the rear wheel 30 and thereby propel the motorcycle 10. A battery assembly 50 is electrically coupled to the drive assembly 46 for powering the drive assembly 46. Although the drive assembly 46 and battery assembly 50 are described herein in the context of the motorcycle 10, it should be understood that the drive assembly 46 and the battery assembly 59 could be used on other electric vehicles, such as automobiles, all-terrain vehicles, and the like.

Figure 4:
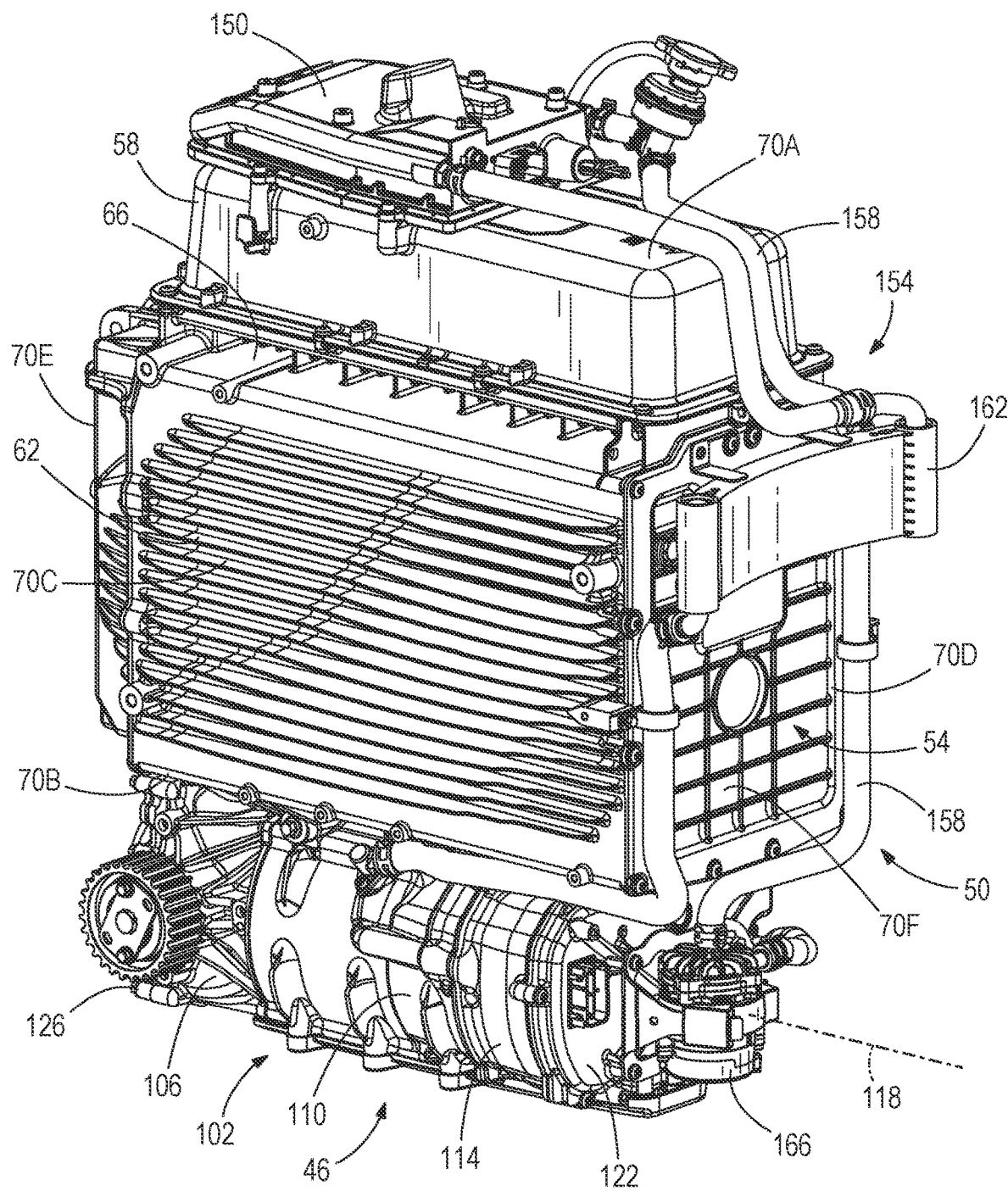
FIG. 4 is a perspective view illustrating the drive assembly, the battery assembly, and a cooling assembly of the electric vehicle of FIG. 1.

Referring to FIG. 4, the illustrated battery assembly 50 includes a battery housing (or simply a "housing") 54 with an upper portion 58 and a lower portion 62, each containing an array of rechargeable battery cells (e.g., lithium-based cells; not shown) that store and supply electrical power (i.e. voltage and current). The upper portion 58 and the lower portion 62 are coupled together by mechanical fasteners with a gap 66 between the two portions 58, 62. The gap 66 may allow air to flow between the upper and lower portions 58, 62 to cool the battery assembly 50. In other embodiments, the housing 54 may be formed as a single piece, without distinct upper and lower portions. The housing 54 has a top side 70A (on the upper portion 58), a bottom side 70B (on the lower portion 62) opposite the top side 70A, and first and second opposite lateral sides 70C, 70D extending between the top and bottom sides 70A, 70B. Rear and front sides 70E, 70F (defined with reference to a forward travel direction of the motorcycle 10) extend between the top and bottom sides 70A, 70B.

Figure 3:
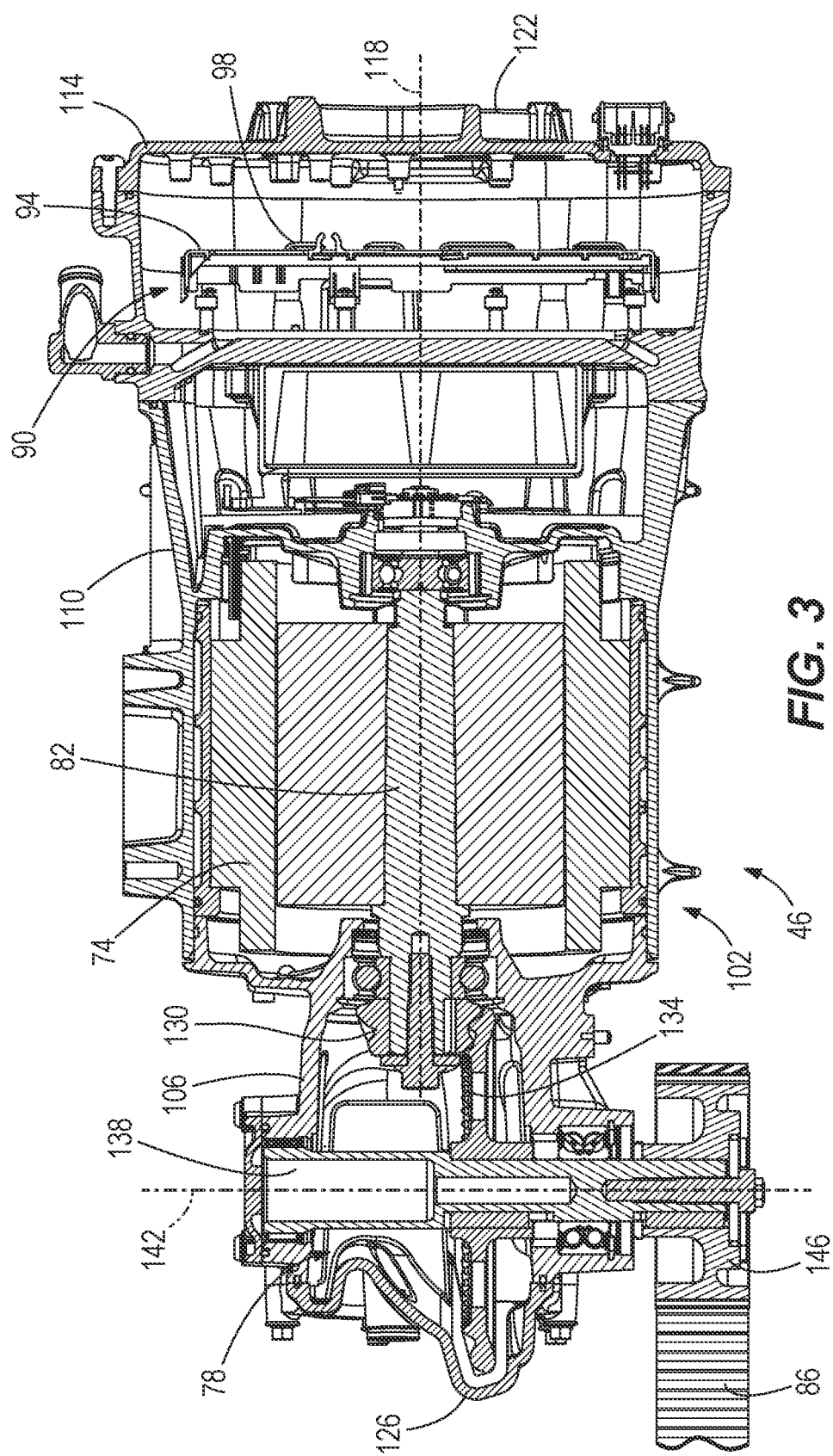
FIG. 3 is a cross-sectional view of the drive assembly of FIG. 1.

The drive assembly 46 is coupled to the battery housing 54 and positioned below the bottom side 70B of the battery housing 54. With reference to FIG. 3, the drive assembly 46 includes a motor 74 and a gear assembly 78 that transmits torque from an output shaft 82 of the motor 74 to a belt 86 that is coupled to the rear wheel 30. In the illustrated embodiment, the motor 74 is an AC induction motor, and the drive assembly 46 further includes an inverter 90 that converts DC power from the battery assembly 50 to AC power to be supplied to the motor 74. The inverter 90 includes a circuit board 94 that connects switching electronics 98 (e.g., IGBTs, MOSFETS, or the like) in an inverter circuit. The circuit board 94 may also include other electronic components that control operation of the motor 74. In other embodiments, the motor 74 may be a DC motor, such that the inverter 90 may be omitted.

Figure 2:
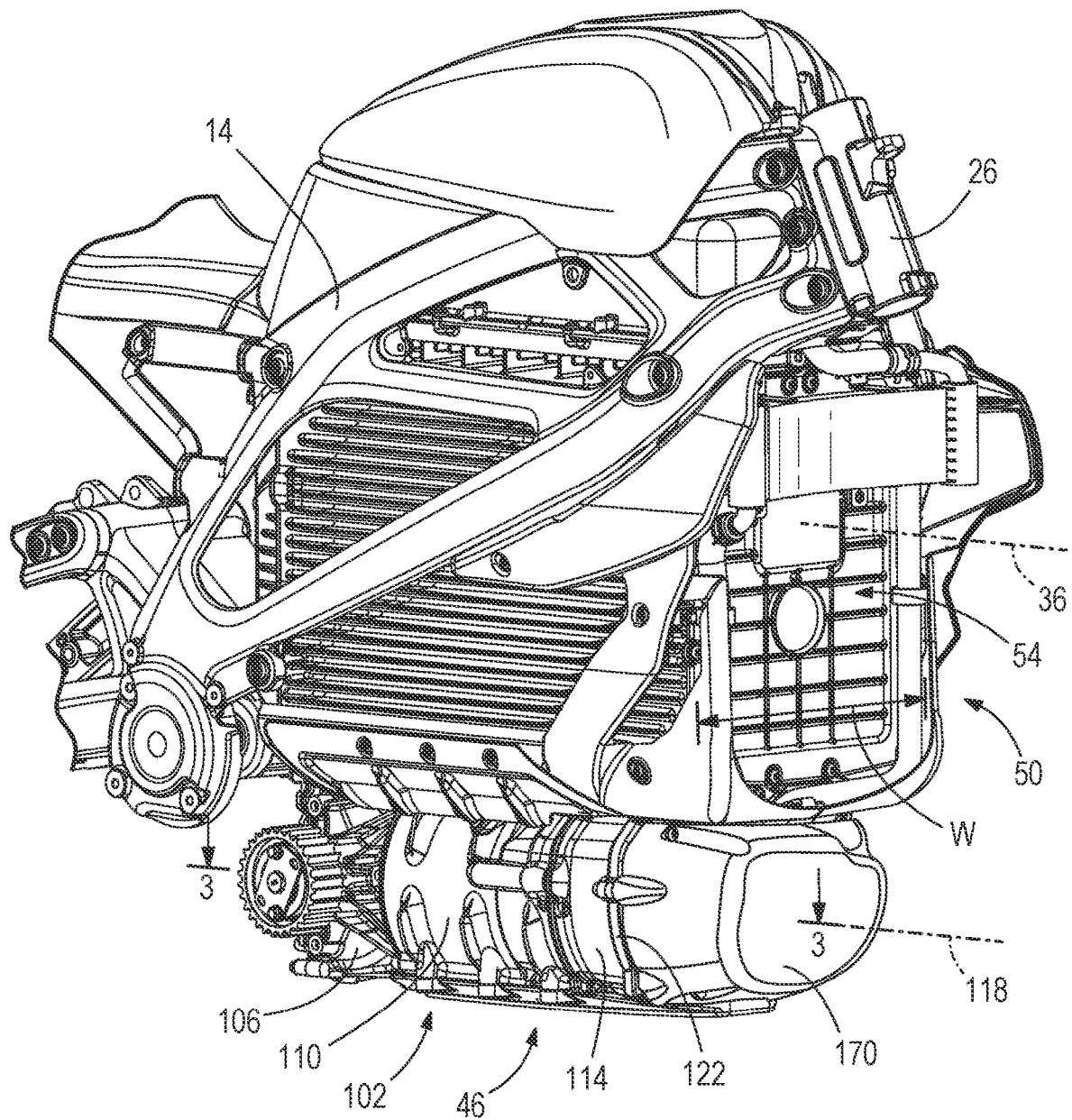
FIG. 2 is a perspective view of a portion of the electric vehicle of FIG. 1, illustrating the drive assembly and a battery assembly of the electric vehicle.

The drive assembly 46 is housed within a drive housing unit 102 that includes a gear housing 106, a motor housing 110, and an inverter housing 114, which are each aligned in series along a longitudinal axis 118 of the drive housing unit 102. The longitudinal axis 118 may be parallel to and/or coaxial with a rotational axis of the output shaft 82. The longitudinal axis 118 is also parallel to the longitudinal axis 36 of the motorcycle 10 (FIG. 1). In the illustrated embodiment, the drive housing unit 102 is positioned such that the longitudinal axis 118 is centered along the width W of the motorcycle 10 (FIG. 2). The drive housing unit 102 includes a front end 122 and a rear end 126, defined with respect to a forward travel direction of the motorcycle 10 (i.e. with reference to FIG. 1, along the longitudinal axis 36 and to the right). The inverter housing 114 defines the front end 122, and the gear housing 106 defines the rear end 126 (FIG. 3). Thus, the inverter housing 114 is disposed in front of the motor housing 110 along the longitudinal axis 118, and the gear housing 106 is disposed behind the motor housing 110 along the longitudinal axis 118.

The gear housing 106 at least partially encloses the gear assembly 78, the motor housing 110 at least partially encloses the motor 74, and the inverter housing 114 at least partially encloses the inverter 90. In the illustrated embodiment, the gear housing 106, the motor housing 110, and the inverter housing 114 are formed as separate pieces and coupled together (e.g., via a plurality of mechanical fasteners, welding, threaded connections or any other suitable means), which may facilitate assembly of the drive assembly 46. In other embodiments, two or more of the gear housing 106, the motor housing 110, or the inverter housing 114 may be integrally formed together as a single piece. The gear housing 106 and the inverter housing 114 are coupled to opposite sides of the motor housing 110 such that the gear assembly 78 and the inverter 90 are positioned on opposite sides of the motor 74.

With continued reference to FIG. 3, the illustrated gear assembly 78 includes a beveled pinion 130 coupled to an end of the output shaft 82 and a beveled drive gear 134 meshed with the pinion 130. The drive gear 134 is supported on a drive shaft 138 for rotation about a drive axis 142 that is perpendicular to the longitudinal axis 118 and the output shaft 82 of the motor 78. In the illustrated embodiment, the drive axis 142 is positioned between the front and rear ends 122, 126 of the drive housing unit 102. The drive gear 134 has a greater number of teeth than the pinion 130 such that the drive shaft 138 rotates at a slower speed than the output shaft 82 of the motor 74. A sprocket 146 is coupled to an end of the drive shaft 138. The sprocket 146 drives the belt 86 (e.g., a toothed belt), which extends between the sprocket 146 and a driven sprocket (not shown) coupled to the rear wheel 30. In other embodiments, other types of belts may be used, or the belt 86 may be replaced with a chain. Alternatively, the drive shaft 138 may be directly coupled to the rear wheel 30, or coupled to the rear wheel 30 via any other suitable torque transfer arrangement.

Referring to FIG. 4, the motorcycle further includes an onboard charger 150 to facilitate charging the battery cells of the battery assembly 50 and a cooling assembly 154 that removes heat from the charger 150 and the drive assembly 46. In the illustrated embodiment, the cooling assembly 154 includes a plurality of coolant lines 158 that fluidly couple the charger 150, the drive assembly 46, and a radiator 162 into a single cooling loop. The radiator 162 is coupled to the front side 70F of the battery housing 54. A coolant pump 166 is directly coupled to the front end 122 of the drive housing unit 102 (and thus, to the inverter housing 114). In other words, the coolant pump 166 is supported on the motorcycle 10 by the inverter housing 114. The coolant pump 166 is operable to circulate coolant (e.g., a liquid coolant such as a glycol) through the cooling assembly 154. The coolant pump 166 is enclosed by a cover 170 that is coupled to the front end 122 of the drive housing unit 102 (FIG. 2). The cover 170 provides protection for the coolant pump 166 and preferably defines an aerodynamic outer shape. In the illustrated embodiment, the lateral sides of the cover 170 are substantially flush with the sides of the inverter housing 114. As such, the cover 170 and the drive housing unit 102 define a single, cohesive assembly underneath the battery housing 54.

Various features of the invention are set forth in the following claims.

What is claimed is:

1. A drive assembly for an electric vehicle comprising:
   a drive housing unit including a motor housing, a gear housing, and an inverter housing;
   a motor at least partially enclosed within the motor housing, the motor having an output shaft defining a rotational axis;
   a gear assembly at least partially enclosed within the gear housing, the gear assembly including a pinion coupled to the output shaft and a drive gear meshed with the pinion; and
   an inverter at least partially enclosed within the inverter housing and configured to supply power to the motor, wherein the gear housing and the inverter housing are positioned on opposite sides of the motor housing.

2. The drive assembly of claim 1, wherein the drive housing unit defines a longitudinal axis, and wherein the motor housing, the gear housing, and the inverter housing are aligned along the longitudinal axis.

3. The drive assembly of claim 2, wherein the longitudinal axis is parallel to the rotational axis of the output shaft.

4. The drive assembly of claim 1, wherein the drive gear is rotatable about a drive axis perpendicular to the rotational axis of the output shaft.

* * * * *